United States Patent [19]
Birdwell et al.

[11] Patent Number: 6,108,706
[45] Date of Patent: *Aug. 22, 2000

[54] TRANSMISSION ANNOUNCEMENT SYSTEM AND METHOD FOR ANNOUNCING UPCOMING DATA TRANSMISSIONS OVER A BROADCAST NETWORK

[75] Inventors: Kenneth J. Birdwell, Bellevue; Brian Moran, Issaquah; James Randall Sargent; Carl R. Witty, both of Bellevue; David S. Byrne, Seattle, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/871,654

[22] Filed: Jun. 9, 1997

[51] Int. Cl.$^7$ ...................................................... G06F 15/16
[52] U.S. Cl. ..................... 709/229; 709/203; 709/217; 709/218; 709/219; 709/230
[58] Field of Search ...................... 395/200.59, 200.97, 395/200.49, 200.48, 200.33, 200.61; 709/229, 217, 219, 218, 203, 230

[56] References Cited

U.S. PATENT DOCUMENTS

| | | | |
|---|---|---|---|
| 5,335,277 | 8/1994 | Harvey et al. | 380/20 |
| 5,359,367 | 10/1994 | Stockill | 348/552 |
| 5,559,808 | 9/1996 | Kostreski et al. | 370/108 |
| 5,565,909 | 10/1996 | Thibadeau et al. | 348/9 |
| 5,625,864 | 4/1997 | Budow et al. | 455/4.2 |
| 5,650,831 | 7/1997 | Farwell | 348/734 |
| 5,666,293 | 9/1997 | Metz et al. | 395/200.5 |
| 5,706,048 | 1/1998 | Davis | 348/12 |
| 5,727,065 | 3/1998 | Dillon | 380/49 |
| 5,774,859 | 6/1998 | Houser et al. | 704/275 |
| 5,778,187 | 7/1998 | Monteiro et al. | 395/200.61 |
| 5,854,897 | 12/1998 | Radziewicz et al. | 395/200.54 |
| 5,877,755 | 3/1999 | Hellhake | 345/327 |
| 5,889,950 | 3/1999 | Kuzma | 395/200.48 |
| 5,907,322 | 5/1999 | Kelly et al. | 345/327 |
| 5,929,850 | 7/1999 | Broadwin et al. | 345/327 |
| 5,935,004 | 8/1999 | Tarr et al. | 463/40 |
| 6,005,565 | 12/1999 | Legall et al. | 345/327 |
| 6,021,433 | 2/2000 | Payne et al. | 709/219 |

OTHER PUBLICATIONS

Kirstein et al, Specification of Security in SAP Using Public Key Algorithms draft–ietf–mmusic–sap–sec–03.txt Nov. 1997.
Mbone Web Site http://www.Mbone.com, No Date.
The MBone Session Agenda http://www.cilea.it/mbone/agenda.html, No Date.
VRML 97 MBone Broadcast Announcement Rem–Conf Archive Feb. 1997.

*Primary Examiner*—Mehmet B. Geckil
*Attorney, Agent, or Firm*—Lee & Hayes, PLLC

[57] ABSTRACT

In a broadcast system in which computer data and other content are delivered from multiple content servers to multiple clients at least partly over a broadcast network, a transmission announcement system announces upcoming broadcast transmissions and instructs the clients on how to receive the broadcast transmissions. Announcement servers (which may or may not be the same as the content servers which serve the data for the broadcast transmissions) generate announcements containing information specifying how associated upcoming transmissions are to be delivered over the broadcast network. The announcement server makes the announcements available to the clients over the broadcast network or over a secondary link other than the broadcast network. As possible examples of the secondary link, the announcement servers might send the announcements to a multicast address over a public network, such as the Internet, or post the announcements at a publicly accessible site on a data network, such as a Web site on the Internet. The clients receive the announcements via the broadcast network or the secondary link. The clients filter the announcements according to predetermined criteria, keeping the announcements satisfying the criteria and discarding the rest. The client searches the announcements that are kept to extract information pertaining to retrieval of the broadcast transmission (e.g., a broadcast protocol, a broadcast locator, a transmission time, etc.). The client then tunes a broadcast receiver to the broadcast locator and launches a receiving application to receive the transmission according to the broadcast protocol.

22 Claims, 4 Drawing Sheets

6,108,706

TRANSMISSION ANNOUNCEMENT SYSTEM AND METHOD FOR ANNOUNCING UPCOMING DATA TRANSMISSIONS OVER A BROADCAST NETWORK

TECHNICAL FIELD

This invention relates to a transmission announcement system for use in conjunction with a data broadcast system in which data is served from content servers over a unidirectional broadcast network to multiple clients. The transmission announcement system enables the servers to send out announcements for upcoming broadcast transmissions to the clients. These announcements may be sent over the broadcast network, or they may be sent over a secondary link independent of the broadcast network. The announcements contain sufficient information to prepare the clients to receive the broadcast transmissions.

BACKGROUND OF THE INVENTION

Conventional computer networks are bi-directional, allowing data communication in both directions between the servers and the clients. Transmitting data over these bi-directional data networks has been a mainstay of computer technology for many years and the communication protocols are well established. Under conventional communication protocols, it is common for the client to initiate connection with the server and to request desired data from the server. As part of the request, the client sends information pertaining to how the data should be sent.

Apart from the classic bi-directional data networks, there is an increasing interest in the use of broadcast networks to deliver computer data and other content to clients, akin to the broadcast delivery of television or radio. Broadcast networks are unidirectional in that data flows from the server to the clients, but no return communication is possible over the same communication path. More particularly, broadcast networks are often characterized as a shared highly asymmetrical network resource with a limited, if not completely absent, low speed return path that does not need to be active to receive transmissions. As a result, the common protocols used for two-way communication over a bi-directional network, such as client-driven connections and data requests, cannot be supported by the broadcast network because the clients are unable to communicate over the broadcast communication link to the server.

The inventors have developed a system and method which address this problem.

SUMMARY OF THE INVENTION

A transmission announcement system facilitates broadcast data transmissions over a unidirectional broadcast network by utilizing pre-broadcast announcements which inform clients of upcoming data transmissions prior to their broadcast and instruct the clients of how to receive the broadcast transmissions.

According to an aspect of the invention, announcement servers (which may or may not be the same as the content servers that serve the data for the broadcast transmissions) generate announcements containing information specifying how associated upcoming transmissions are to be delivered over the broadcast network. The announcements might correspond to single transmissions, or might provide a list of transmissions. The announcements contain such information as a broadcast locator (e.g., a universal resource locater (URL) on the Web, a broadcast channel, etc.), an identity of the content server that will be serving the data for the transmission, a time of transmission, a broadcast protocol, a subject matter of the data transmission, a length of the transmission, and a rating of the content contained in the transmission.

The announcement server makes the announcements available to the clients over the broadcast network on a reserved multicast address or over a secondary link other than the broadcast network. As one example of the secondary link, the announcement servers might send the announcements to a multicast address over a public network, such as the Internet. As another example, the announcement servers might post the announcements at a publicly accessible site on the network, such as at a Web site on the Internet. The clients receive the announcements via the secondary link by, for example, monitoring the multicast address or occasionally accessing the Web site.

According to another aspect of the invention, a client filters the announcements according to predetermined criteria, keeping the announcements satisfying the criteria and discarding the rest. Filters used by the client can be filters automatically created in software based upon user behavior patterns, or user-defined custom filters created from parameters entered by a user. For the announcements that are kept as being of interest, the client searches them to extract the broadcast protocol, broadcast locator, transmission time, and any other information pertaining to retrieval of the broadcast transmission. The client tunes a broadcast receiver to the broadcast locator and launches a receiving application to receive the transmission according to the broadcast protocol.

DETAILED DESCRIPTION OF THE PREFERRED EMBODIMENT

Figure 1:
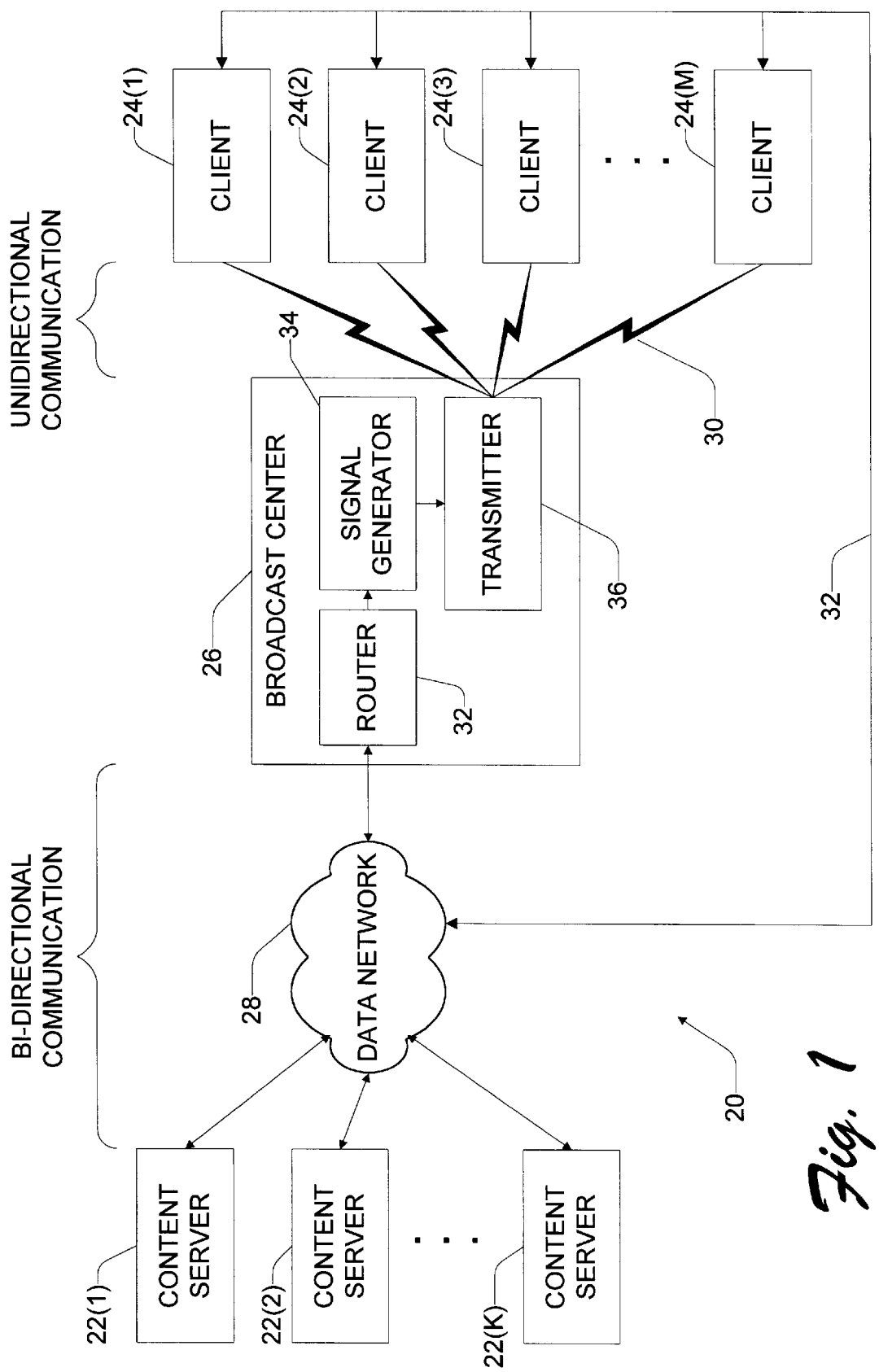
FIG. 1 is a diagrammatic illustration of a transmission announcement system operating in conjunction with a broadcast data delivery system.

FIG. 1 shows a system 20 which implements a broadcast data delivery system for broadcast delivery of computer data and other content from multiple content servers 22(1), 22(2), . . . , 22(K) to multiple clients 24(1), 24(2), 24(3), . . . , 24(M). The system 20 further implements a transmission announcement system in which announcements for up-coming broadcast transmissions are made available by the servers for the clients before the broadcast data transmissions.

In the FIG. 1 implementation, the content servers 22(1) –22(K) are connected to a broadcast center 26 via a bi-directional data network 28 which enables two-way communication between the content servers 22(1)–22(K) and the broadcast center 26. The content servers serve data in the form of audio, video, animation, bit maps or other graphics, applications or other executable code, text, hypermedia, or other multimedia types. As an exemplary implementation, the content servers 22(1)–22(K) are implemented as personal computers or workstations running a multitasking, disk-based operating system, such as Windows® NT from Microsoft Corporation. The content servers might also be configured as continuous media file servers which serve data files at a constant data rate. An exemplary construction of a file server comprises a disk array of storage disks, with the data files striped across the storage disks, and one or more servers which cooperate together to serve the data files from the storage disks.

The bi-directional data network 28 represents various types of networks, including the Internet, a LAN (local area network), a WAN (wide area network), and the like. The data network 28 can be implemented in a number of ways, including wire-based technologies (e.g., fiber optic, cable, wire, etc.) and wireless technologies configured for two-way communication (e.g., satellite, RF, etc.). The data network 28 can further be implemented using various available switching technologies (e.g., ATM (Asynchronous Transfer Mode), Ethernet, etc.) and different data communication protocols (e.g., TCP/IP, IPX/SPX, etc.). In such protocols, the data is packaged in individual, fixed byte-size packets which are transmitted separately over the data network.

The broadcast center 26 receives the data served from the content servers 22(1)–22(K) over the network 28 and broadcasts the data over a broadcast (or multicast) network 30 to the clients 24(1)–24(M). The broadcast network 30 is a unidirectional network in which the data is carried in one direction from the broadcast center 26 to the many clients 24(1)–24(M). The clients are unable to reply or initiate communication to the broadcast center 26 using the broadcast network 30.

The broadcast network 30 can be implemented in a variety of ways. For instance, the broadcast network might be implemented as a wireless network configured for one-way transmission (i.e., satellite, radio, microwave, etc.). The broadcast network might also be a network which supports two-way communication, but is predominately used for unidirectional multicasting from the broadcast center 26 to the clients simultaneously without the clients foreknowledge. Although only one broadcast center 26 is illustrated for explanation purposes, the system 20 can scale to include multiple broadcast centers coupled between numerous servers 22 and numerous clients 24.

The broadcast center 26 includes a router 32, a signal generator 34, and a broadcast transmitter 36. The router 32 is coupled to the bi-directional data network 28 to receive the data served over the network 28 from the content servers 22(1)–22(K). The router 32 is a final node of the data network 28 in which data communication is bi-directional to that point and unidirectional past that point. The router 32 is preferably configured as a bridge-router between the traditional data network 28 and the broadcast network 30. A bridge-router is capable of supporting video and audio broadcast transmission.

Data is received at the router 32 and converted from the network packet format to a format appropriate for broadcast transmission. The signal generator 34 generates a broadcast signal with the data embedded thereon to carry the data over the broadcast network 30. The broadcast signal is passed to the transmitter 36 where it is broadcast over the broadcast network 30 to the clients 24(1)–24(M).

The clients 24(1)–24(M) may also coupled to the content servers 22(1)–22(K) through a secondary link 32 that is separate from the broadcast network 30. In the FIG. 1 illustration, assuming the data network 28 is implemented as the Internet or other public network, the secondary link 32 can provide access directly to the servers from the clients through the data network 28. In one implementation, the pre-broadcast announcements are made available over the data networks 28 to a multicast address which the clients access using this secondary link 32. The secondary link 32 might also be implemented as another unidirectional network (e.g., paging network, radio network, and cellular network) that is independent of the primary broadcast network.

The clients 24(1)–24(M) can be implemented in a number of ways, including desktop computers, laptop computers, and computer enhanced television units. As an example implementation, the client is a broadcast-enabled personal computer.

Figure 2:
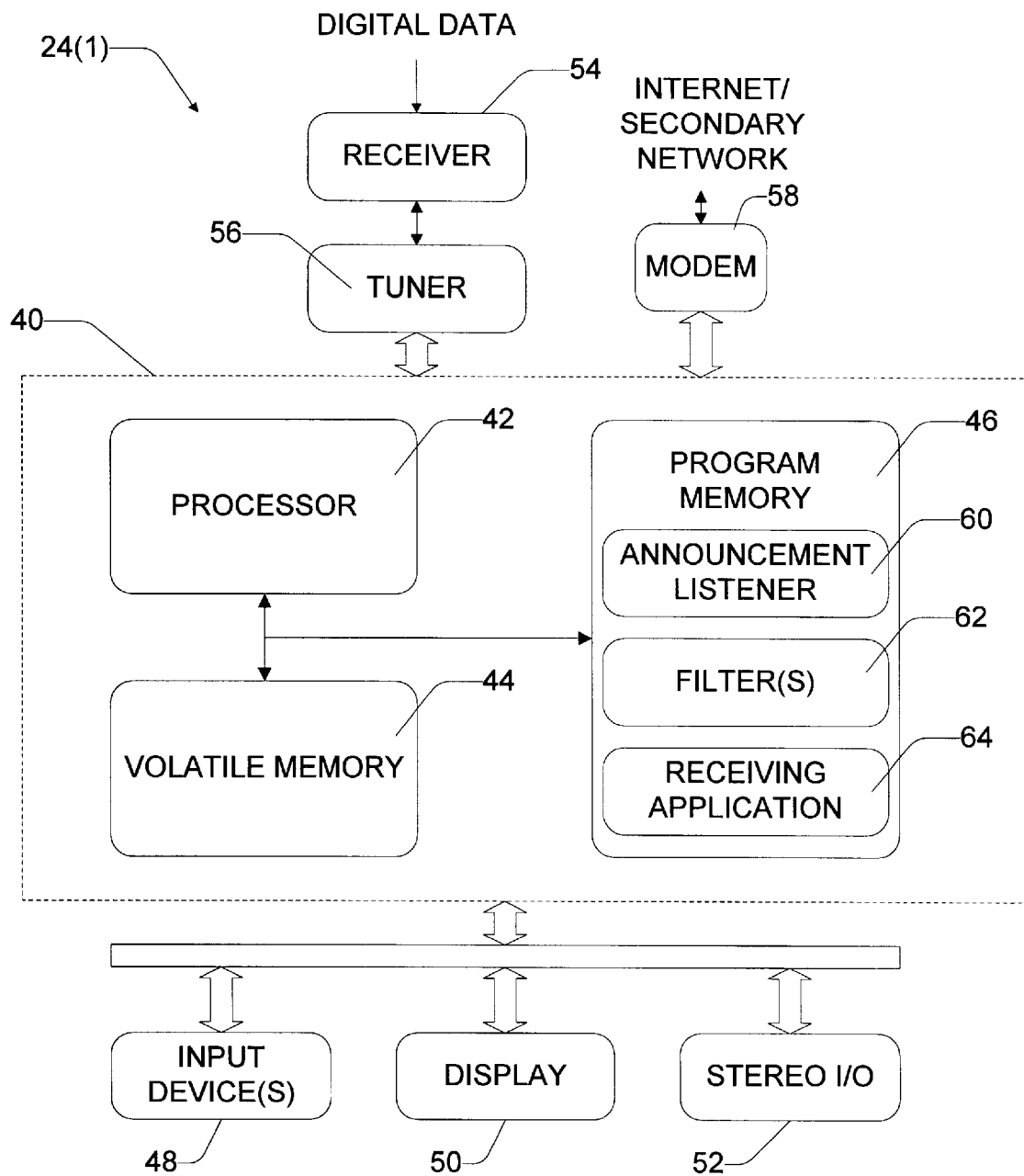
FIG. 2 is a block diagram of a client computing unit.

FIG. 2 shows an exemplary configuration of a client 24(1) implemented as a broadcast-enabled computer. It includes a central processing unit 40 having a processor 42 (e.g., x86 or Pentium® microprocessor from Intel Corporation), volatile memory 44 (e.g., RAM), and program memory 46 (e.g., ROM, disk drive, floppy disk drive, CD-ROM, etc.). The client 24 (1) has one or more input devices 48 (e.g., keyboard, mouse, etc.), a computer display 50 (e.g., VGA, SVGA), and a stereo I/O 52 for interfacing with a stereo system.

The client 24(1) includes a digital broadcast receiver 54 (e.g., satellite dish receiver, RF receiver, microwave receiver, etc.) and a tuner 56 which tunes to frequencies of the broadcast network 30. The tuner 56 is configured to receive digital broadcast data in a particularized format, such as MPEG-encoded digital video and audio data, as well as digital data in many different forms, including software programs and programming information in the form of data files. The client 24(1) also has a modem 58 which provides access to the Internet or other network that is utilized as the secondary link. For other implementations of the secondary link, the modem 58 might be replaced by a network card, or an RF receiver, or other type of port/receiver which provides access to the secondary link.

The client 24(1) runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems which provide windowing environments may be employed, such as the Macintosh operating system from Apple Computer, Inc. and the OS/2 operating system from IBM.

One example implementation of a broadcast-enabled PC is described in a co-pending U.S. patent application Ser. No. 08/503,055, entitled "Broadcast-Enabled Personal Computer," filed Jan. 29, 1996 in the names of Gabe L. Newell, Dan Newell, Steven J. Fluegel, David S. Byrne, Whitney McCleary, James O. Robarts, Brian K. Moran; William B. McCormick, T. K. Backman, Kenneth J. Birdwell, Joseph S. Robinson, Alonzo Gariepy, Marc W. Whitman, and Larry Brader. This application is assigned to Microsoft Corporation, and is incorporated herein by reference.

The client 24(1) is illustrated with three software programs: an announcement listener 60, one or more filters 62, and a receiving application 64. Each program is stored in program memory 46, loaded into volatile memory 44 when launched, and executed on the processor 42. The announcement listener 60 executes in background to listen for announcements. The announcements are submitted by the servers over the data network 28 to inform the clients of upcoming data transmissions that will be broadcast at a future time over the broadcast network 30. Rather than the clients requesting particular data from the servers, as is customary in conventional data networks but cannot be supported by unidirectional broadcast networks, the servers tell the clients through the announcements what data will be served over the broadcast network at a given time and how to find that data.

The announcements include broadcast-related information, such as an identification of the sender, a broadcast locator (e.g., URL, channel, frequency, etc.) at which the transmission is to be broadcast, a time when the transmission is to be broadcast, and a broadcast protocol used to transmit the digital data. The announcements further include information pertaining to the content of the transmission, including a title, a type of content (e.g., sports, science fiction, mystery, action, documentary, audio, graphical, etc.), a subject matter description, a length of transmission, a rating, actor/actress names, and so forth.

The announcements received by the announcement listener 60 are passed onto the filter(s) 62. The filter(s) 62 register with the announcement listener 60 during configuration to make themselves available to receive the announcements. The filter(s) 62 examine each announcement for a match against a list of data transmissions in which the user is interested, or against other types of predefined rules of acceptance. The filter(s) 62 retain the announcements of interest, and discard the rest. The number of transmissions each day is anticipated to be in the thousands, and the client 24(1) is expected to only be interested in a small portion of the transmissions. Accordingly, the filter(s) 62 continuously weed out unwanted transmissions and keep only the announcements pertaining to transmissions of interest.

After receiving an announcement for a desired transmission, the announcement listener passes the announcement to the receiving application 64 which understands the transmission protocol of the broadcast transmission. The receiving application 64 is launched in a timely manner before the scheduled broadcast and receives the data transmission from the broadcast receiver 54 and tuner 56.

Figure 3:
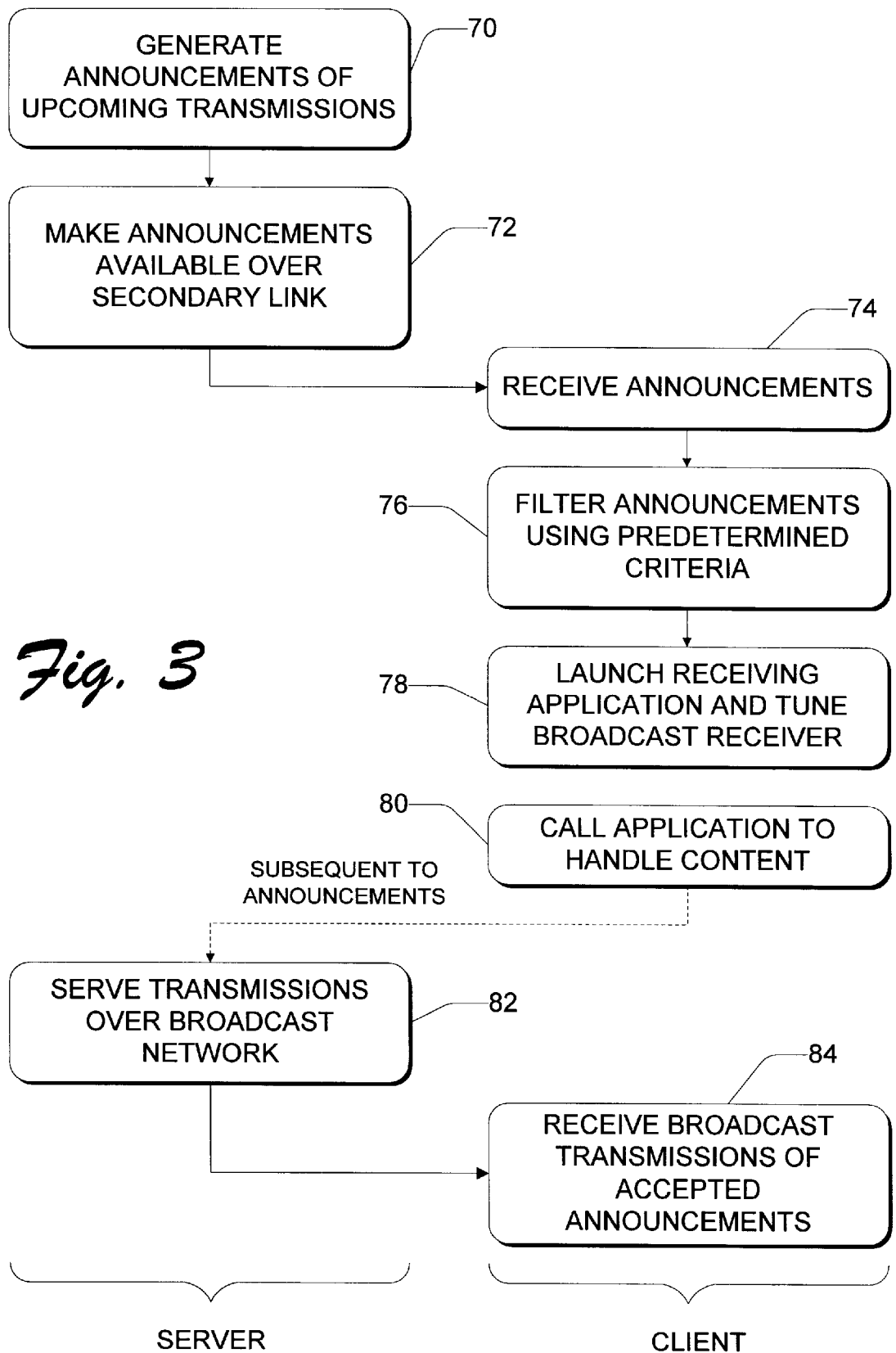
FIG. 3 is a flow diagram showing steps in a method for operating the transmission announcement system to announce delivery of upcoming data transmissions over the broadcast network.

FIG. 3 shows exemplary steps in a method for announcing delivery of upcoming data transmissions over a broadcast network. These steps are performed by software executing at the servers and clients. At step 70, one of the servers 22(1)–22(K)—an announcement server-generates announcements containing information specifying how associated upcoming transmissions are to be delivered over the broadcast network 30. The announcement server can be the same as the content server that serves the associated content to be transmitted over the broadcast network, or by a designated server separate from the content server.

At step 72 in FIG. 3, the announcement server makes the announcements available to the clients over a secondary link 32. One way the announcements are made available is to transmit them over the data network 28. The announcement server sends the announcements as multicast packets, such as a Multicast UDP (User Datagram Protocol), to a predetermined multicast address on the Internet. Another technique is to post the announcements at a publicly accessible location on the network 28, such as at a Web site on the Internet.

In one exemplary implementation, the data contained within the multicast packet is written according to the Session Announcement Protocol and Session Description Protocol (referred to as "SAP/SDP"). SAP/SDP is typically used to announce multimedia audio/video conferences and can be used to build a static local database that can be interactively viewed at the client. The SAP/SDP protocol itself is well known, and is described in M. Handley "SAP: Session Announcement Protocol", INTERNET-DRAFT, draft-ietf-mmusic-sap-00.txt, Nov. 27, 1996 and M. Handley "SDP: Session Description Protocol", INTERNET-DRAFT, draft-ietf-mmusic-sdp-03.txt, Mar. 26, 1997.

Another variation is to use an SAP/SDP-compliant announcement that uses an address other than the primary address for SAP/SDP.

At step 74 in FIG. 3, the clients monitor the multicast address and destination port to receive the multicast packets containing the announcements. More particularly, the announcement listener 60 is configured to listen to the multicast address and destination port. Upon receipt of the SAP/SDP announcement, the announcement listener 60 understands that the multicast packet contains an announcement that is not intended to be added to the local user viewable database for review by human eyes; but, is instead destined for program filters which operate in the background to analyze the hidden SAP announcements. The announcement listener 60 passes the multicast packet onto the one or more filters 62 which have previously registered themselves with the announcement listener 60. At step 76 in FIG. 3, the filter(s) 62 filter the announcements according to predefined criteria.

Figure 4:
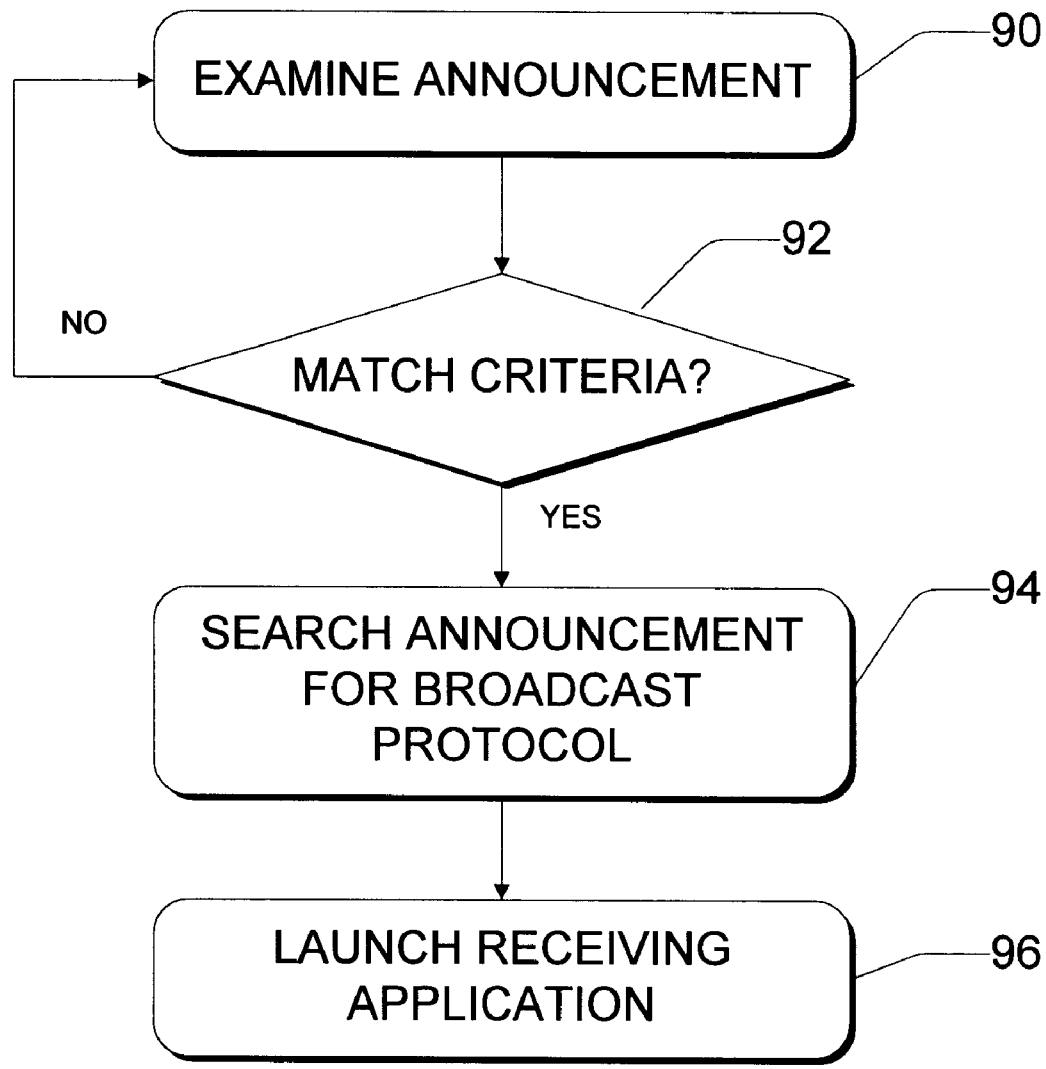
FIG. 4 is a flow diagram showing steps in a method performed at the client computing unit when handling the announcements.

FIG. 4 shows exemplary steps in a method for handling an announcement during the filtering step. The FIG. 4 steps are performed by software, and namely the announcement listener 60 and filter(s) 62, executing at the clients. At step 90, the client examines the announcement against the predefined criteria. The criteria can be embodied in many different ways. For example, the criteria might be in the form of a list of wanted transmissions, such as a list identifying all sports-related programs or all business news. The criteria might alternatively be a set of attributes describing potentially interesting content. The criteria might further be in the form of rules for accepting certain announcements.

One exemplary filter uses Regular Expression Parsing to filter the multicast packets. The filter is given a regular expression, and compares each packet for a possible match of the regular expression. An example of a rule for this type of filter is as follows:

"*a*=webcast://www.microsoft.com/mscorp"

This filter rule examines each announcement to see if it pertains to a Web site broadcast that contains data from the Microsoft corporate information page. The filter is used in conjunction with a WebCast program which handles automatic web cache updating. A "WebCast" is a unidirectional broadcast of Web related information available on the Internet. The broadcast center broadcasts this Web information to periodically update the cache at the clients as a supplement to the information that the clients can directly request in customary fashion over the Internet.

If the announcement does not satisfy the criteria (i.e., the "no" branch from step 92 in FIG. 4), the announcement is discarded and the filter examines the next announcement at step 90. Conversely, if the announcement does match the criteria (i.e., the "yes" branch from step 92 in FIG. 4), the announcement listener 60 searches the announcement for the broadcast protocol (step 94 in FIG. 4). An exemplary broadcast protocol is the Broadcast File Transfer Protocol (BFTP). This protocol is represented as:

*a*=–BFTPID:<ID for BFTP>

The BFTP content identifier replaces the area inside the angle brackets. The BFTP is explained in greater detail in a co-pending application entitled "Data Delivery System And Method For Delivering Data And Redundant Information Over A Unidirectional Network," filed concurrently with this application in the names of Carl Witty, Kenneth Birdwell, and Randy Sargent, which is assigned to Microsoft Corporation. This application is incorporated by reference. It is noted that the announcement listener 60 supports installation of custom protocol types other than BFTP. Upon locating the broadcast protocol, the announcement listener 60 automatically launches the receiving application 64 (step 96 in FIG. 4).

With reference again to FIG. 3, at step 78, the launched receiving application 64 sends tuning information to the tuner 56 to tune the receiver 58 to the appropriate broadcast frequency specified in the announcement. The announcement listener 60 also calls an application that will ultimately handle the content contained in the broadcast transmission (step 80 in FIG. 3). The application might be, for example, a video application that handles video data for presentation on the display. Another example might be a WebCast program, which is called as follows:

WebCastReceive.exe % 1

The % 1 is replaced with the path to the file that the receiving application received.

At the stipulated broadcast time following the announcement, the announcement server (or separate content server) begins serving the content over the data network 28 to the broadcast center 26 for broadcast over the broadcast network 30 (step 82 in FIG. 3). The client receives the broadcast via the broadcast receiver 54 which is tuned to the appropriate channel or frequency (step 84 in FIG. 3).

According to another aspect of this invention, the rules used by the filters 62 can be entered by the user or automatically created according to user behavior patterns. According to the first option, the user can enter attributes, or select from a list of attributes, through a user interface (UI) designed to gather user preferences. For instance, a user wishing to receive all content on the Middle East might define attributes which attempt to locate announcements pertaining to transmissions with content on the Middle East.

Another technique is to create a user profile by asking a series of questions directed at discovering the user's likes and dislikes. The question-and-answer session is accomplished using a UI which asks questions and enables users to choose among responses, such as "strongly like," "like," "dislike," and "strongly dislike." Rather than discrete answers, the question-and-answer screen might include sliders which enable viewers to choose somewhere in a scale between opposing preferences of "strongly dislike" and "strongly like." The client computer compiles the user profile and correlates the profile with clustering data to generate a filter for future announcements. The clustering data represents an accumulation of other user preferences. By matching the user profile with similar profiles, the filter can better determine what the user is most interested in.

As an alternative, the announcement listener 60 might be configured to automatically develop filters 62 based on user behavior patterns. For example, filter instances can be added, edited, or removed using an Application Program Interface (API) to the announcement listener 60. The API allows any application that calls it to add, edit, or remove filter instances. For example, a Web cache analyzer application which searches the user's Web cache to determine what sites are of interest to the user might call the API to add or remove filters based upon the sites commonly requested by the user. Another example is a software purchasing application that adds a filter based on software the client wishes to download and purchase.

In compliance with the patent statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A transmission announcement system for announcing upcoming transmissions to be delivered over a broadcast network, comprising:

a server and a client;

the server being configured to create announcements containing information pertaining to upcoming transmissions to be delivered over the broadcast network and to make the announcements over a secondary link to the s client that is separate from the broadcast network; and the client being configured to receive the announcements from the secondary link and filter the announcements received from the server using at least one filter automatically created at the client from user behavior patterns, the filter parsing the announcements to determine whether the announcements match predefined expressions or satisfy a predefined rule.

2. A transmission announcement system as recited in claim 1, wherein the announcements contain information which enable the client to locate the broadcast transmission.

3. A transmission announcement system as recited in claim 1, wherein the transmissions are broadcast over the broadcast network according to the information contained in the announcements, the client being configured to receive the transmission from the broadcast network using the information contained in the announcements.

4. In a system having a broadcast network over which data transmissions served by a server are broadcast to multiple clients, each client and server having a computer-readable medium, the computer-readable media on the server and at least one client hang computer-executable instructions for performing steps comprising:

generating announcements, at the server, containing information specifying how associated upcoming transmissions are to be delivered over the broadcast network, the announcements being made available to the clients via means other than other than the broadcast network;

automatically creating a filter from user behavior patterns;

filtering, at the client, the announcements received from the server using the filter; and using the announcements, at the client to prepare the client to receive at least one of the transmissions.

5. Computer-readable media having computer-executable instructions as recited in claim 4, further comprising computer-executable instructions to create the announcements as including a broadcast protocol specifying a format in which the associated transmissions are to be broadcast.

6. In a system having a broadcast network over which data transmissions served by a server are broadcast to multiple clients, each client and server having a computer-readable medium, the computer-readable media on the server and at least one client having computer-executable instructions for performing steps comprising:

generating announcements, at the server, containing information specifying how associated upcoming transmissions are to be delivered over the broadcast network, the announcements being made available to the clients;

automatically creating an announcement filter based upon user behavior patterns;

filtering the announcements using the announcement filter to selectively choose certain ones of the announcements; and using the announcements to prepare the client to receive the certain ones of is the transmissions.

7. In a system having a broadcast network over which data transmissions served by a server are broadcast to multiple clients, each client and server having a computer-readable medium, the computer-readable media on the server and at least one client having computer-executable instructions for performing steps comprising:

generating announcements, at the server, containing information specifying how associated upcoming transmissions are to be delivered over the broadcast network, the announcements being made available to the clients;

filtering the announcements using an announcement filter that is automatically created based upon user behavior patterns:

using the filtered announcements to prepare the client to receive the certain ones of the transmissions; and launching a software application at the client to receive said certain ones of the transmissions from the broadcast network.

8. A method for announcing delivery of upcoming data transmissions over a broadcast network, comprising the following steps:

multicasting announcements containing information pertaining to the upcoming data transmissions;

automatically creating an announcement filter based upon user behavior patterns;

filtering the announcements using the announcement filter:

parsing each announcement using Regular Expression Parsing; and preparing to receive at least one of tie upcoming transmissions from the broadcast network based upon the information contained in an announcement tat survives the filtering.

9. A method as recited in claim 8, wherein the step of preparing comprises the step of launching a software application to receive said at least one transmission from the broadcast network.

10. A method as recited in claim 8, further comprising the step of transmitting said at least one transmission over the broadcast network and receiving said at least one transmission from the broadcast network.

11. Computer-readable media having computer-executable instructions for performing the steps of the method as recited in claim 8.

12. Computers programmed to perform the steps of the method as recited in claim 8.

13. In a system where transmissions are broadcast over a broadcast network and announcements of the transmissions are made available prior to the broadcasts, a method for handling one of the announcements comprising the following steps:

automatically defining criteria based upon user behavior;

comparing the announcement with the criteria;

in an event that the announcement complies with the criteria, searching the announcement for information specifying how to receive the transmission over the broadcast network; and using the information from the announcement to prepare to receive the transmission over the broadcast network.

14. A method as recited in claim 13, further comprising the step of defining the criteria according to parameters entered by a user.

15. A method as recited in claim 13, further comprising the step of launching a software application to receive the broadcast transmission.

16. A method as recited in claim 13, further comprising the step of tuning a broadcast receiver to a designated broadcast channel to receive the broadcast transmission.

17. A computer-readable medium having computer-executable instructions for performing the steps of the method as recited in claim 13.

18. A computer programmed to perform the steps of the method as recited in claim 13.

19. A method for announcing delivery of upcoming data transmissions over a broadcast network, comprising the following steps:

forming, at a server, announcements containing information pertaining to the upcoming data transmissions, the information including a broadcast protocol for broadcasting the transmissions;

sending the announcements from the server in multicast packets to a predetermined multicast address;

monitoring the multicast address from a client to receive the multicast packets containing the announcements;

automatically defining a filter based upon user behavior;

filtering the anouncements at the client using the filter;

searching the certain announcements to extract the broadcast protocol; and using the broadcast protocol to prepare to receive upcoming transmissions associated with the certain announcements from the broadcast network.

20. A computer-readable medium having computer-executable instructions for performing the steps of the method as recited in claim 19.

21. A computer programmed to perform the steps of the method as recited in claim 19.

22. A transmission announcement system for announcing upcoming transmissions to be delivered over a broadcast network, comprising:

a server and a client;

the server being configured to create announcements containing information pertaining to upcoming transmissions to be delivered over the broadcast network and to make the announcements over one of the broadcast network or a secondary link to the client that is separate from the broadcast network; and the client being configured to receive and filter the announcements from the broadcast network or the secondary link using filters automatically created at the client from user behavior patterns, the filters parsing the announcements to determine whether the announcements match predefined expressions or satisfy a predefined rule.

* * * * *

UNITED STATES PATENT AND TRADEMARK OFFICE
CERTIFICATE OF CORRECTION

PATENT NO.    : 6,108,706
DATED         : August 22, 2000
INVENTOR(S)   : Moran et al.

It is certified that error appears in the above-identified patent and that said Letters Patent is hereby corrected as shown below:

<u>Title page,</u>
Item [75], replace the third inventor's name to read -- James Randal Sargent --.

<u>Column 8,</u>
Line 53, replace "hang" with -- having --.

<u>Column 9,</u>
Line 49, replace "tie" with -- the --.
Line 51, replace "tat" with -- that --.

<u>Column 10,</u>
Line 38, replace "anouncements" with -- announcements --.

Signed and Sealed this

Fourteenth Day of January, 2003

JAMES E. ROGAN
*Director of the United States Patent and Trademark Office*